July 30, 1968 KO KO GYI 3,394,881

PORTABLE RECORDING

Filed Aug. 16, 1966 10 Sheets-Sheet 2

FIG. 4A (Top View)
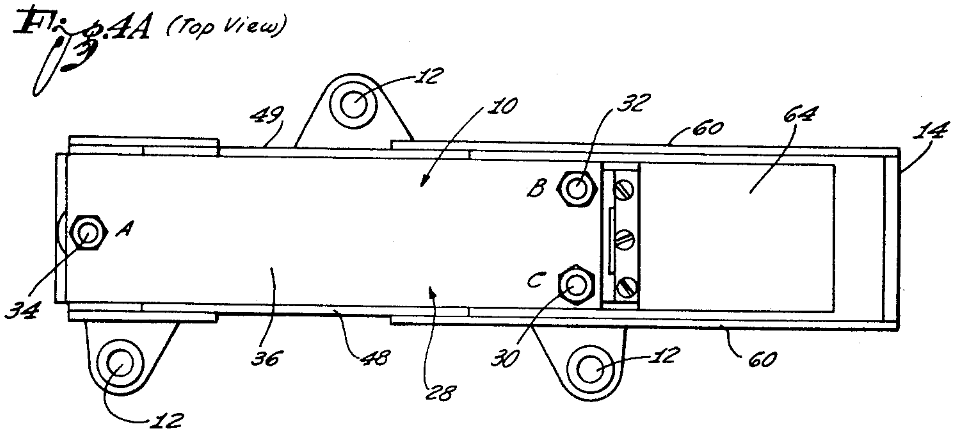
FIG. 4B
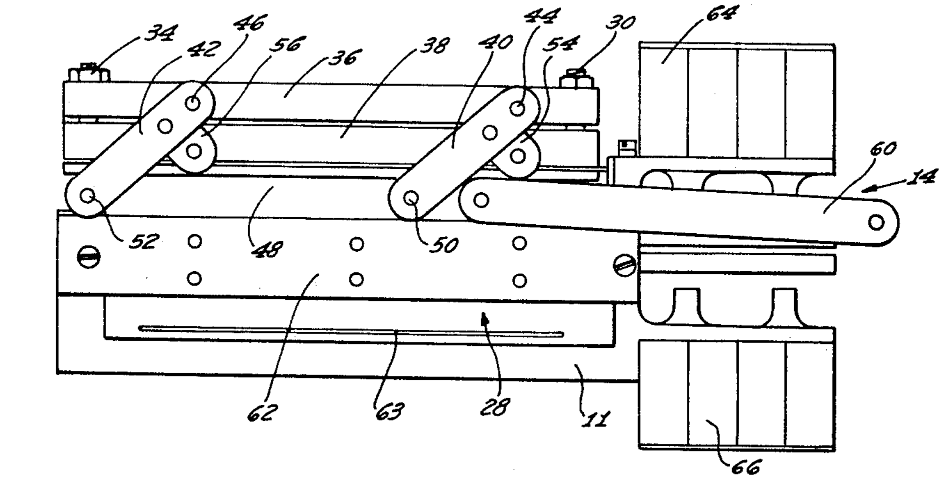

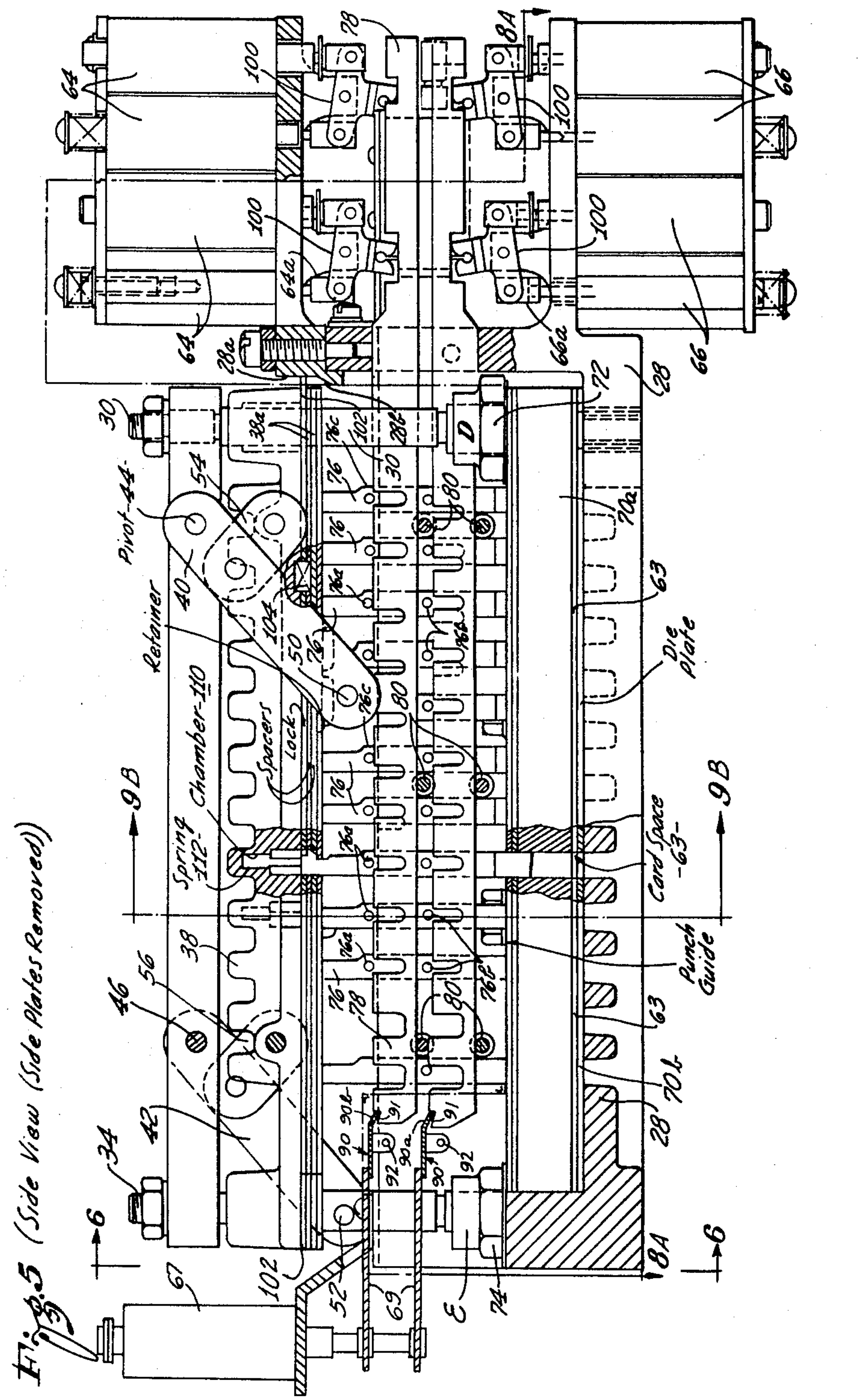
Fig. 5 (Side View (Side Plates Removed))

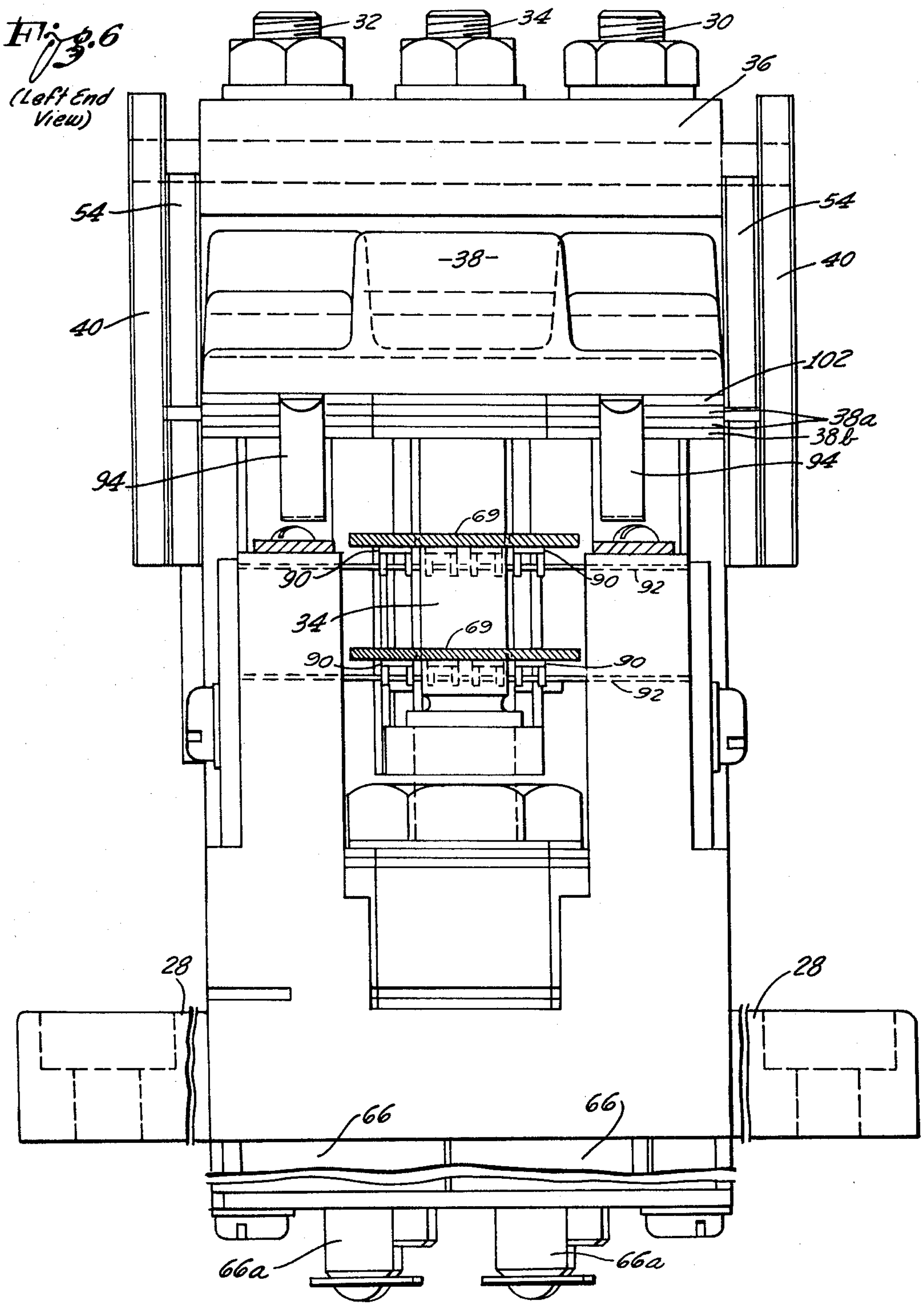
Fig. 6 (Left End View)

July 30, 1968 KO KO GYI 3,394,881

PORTABLE RECORDING

Filed Aug. 16, 1966 10 Sheets-Sheet 7

(End View)

3,394,881

PORTABLE RECORDING

Ko Ko Gyi, Gardena, Calif., assignor to Hersey-Sparling Meter Company, Dedham, Mass., a corporation of Massachusetts Filed Aug. 16, 1966, Ser. No. 572,781
5 Claims. (Cl. 234—102)

ABSTRACT OF THE DISCLOSURE

Portable recording device having recording elements with projections thereon, each recording element being controlled by two or more slide-like control members having a coded arrangement of slots. The slots register with the projections of selected recording elements when control members are moved to one of two positions, thereby permitting the selected recording elements to move to a recording position in accordance with data to be recorded, and an actuator to move the recording elements.

The present invention relates to mechanisms for acquiring and recording data. The invention relates more particularly to an improved portable recording unit which responds to digital input signals to provide a marked card record of the decimal equivalent of the signals. The digital input signals may represent, for example, utility meter readings, linear movements, monetary values, weight measurements, etc. The invention is particularly useful in connection with apparatus disclosed in U.S. patent application Ser. No. 527,852, filed Feb. 16, 1966, and in a U.S. patent application entitled, Electrically Connecting and Disconnecting, filed May 24, 1966, by Robert Raymond Siders and Roger Williams Hood.

Systems are known in which electrical encoders are installed in domestic utility meters, or the like. Such encoders serve to convert the utility meter readings, such as the domestic water meter readings, for example, into corresponding binary coded signals which are conducted along electrical leads to an outlet located at the premises in a convenient and accessible place, direct access to the meter itself thereby being unnecessary.

It is contemplated, in the practice of the present invention, that the person obtaining the readings from a data source, such as utility meters at various premises, will carry a portable unit embodying the concepts of the invention, and will plug the unit into the receptacles, or outlets, at the various premises.

A usual IBM card, or the like, is inserted into the unit. The card is punched, or otherwise marked, by a module included in the unit, so that it bears a record of the reading of the corresponding data source. This procedure is repeated at each of the premises where readings are to be taken.

The mechanism of the invention may also be constructed to permit manual settings to be made at locations which are not equipped with the aforesaid encoder. These manual settings are made by the operator to correspond to his visual reading of the corresponding data source. The card is inserted into the mechanism, and the mechanism operated, so that a recording may be made on the card.

The resulting cards hear information relating to the readings of the various utility meters, or other data sources. This information is in proper form so that it may be introduced directly into electronic data processing equipment at a central station so as to simplify the billing process.

It is, accordingly, an object of the present invention to provide an improved data acquisition and recording mechanism which is conceived and constructed so as to find particular utility in transcribing binary coded signals representative of the readings of a utility meter, or other data source, into a decimal coded record, or the like.

Another object of the invention is to provide such an improved mechanism which is light in weight and compact in size, so that it may be easily carried by the operator from one premise to another.

Yet another object of the present invention is to provide such an improved mechanism which is extremely simple to operate, and yet which is accurate, precise and not readily susceptible to error.

A still further object of the invention is to provide such an improved mechanism which is rugged in its construction, and capable of withstanding normal usage.

A further important object is to provide such mechanism with low power requirements.

Other objects and advantages of the invention may be realized from a consideration of the following description, when the description is taken in conjunction with the accompanying drawings, in which:

FIG. 1 is a functional perspective schematic representation of the concept of the invention;

FIGS. *2a–2d* are different views of the housing and external components of a card punching unit, constructed in accordance with the concepts of the present invention; and intended to be carried by a meter man;

FIG. 4A is a plan view of a card punching module included in the unit of FIG. 1;

FIG. 4B is a side elevation view of the card punching module;

FIG. 5 is a side view of the card punching module, partly in section, and on an enlarged scale with respect to the view of FIG. 4;

FIG. 6 is a view of the card punching module taken from the left hand end of FIG. 5;

It is to be understood that although the mechanism of the invention will be described as a card "punching" mechanism, other card makings, such as printing, may be effectuated by the mechanism by a simple modification. Also, the utility of the mechanism is obviously not limited to reading utility meters, since it can be used in conjunction with any data source.

The primary purpose of the card punching unit, therefore, is to convert coded binary signals into corresponding punches on a card. For example, the usual IBM card includes adjacent columns each representative of decimal numbers 0–9. Then, when four binary signals are applied to the unit, a punch will appear at one of the number positions in the corresponding column on the card, as determined by the particular coding of the four binary signals.

When the unit is used in conjunction with a usual utility meter, for example, four sets of signals will be applied to the unit, respectively representing the "units," "tens," "hundreds" and "thousands" readings of the meter. When the unit is actuated, these signals will cause it to produce corresponding punches in each of four adjacent columns on the card.

When the aforesaid binary signals are applied to the card punching unit, they energize different solenoids in the unit. These solenoids, in turn, selectively operate different ones of a group of selector slides so that the appropriate punches may be released. The released punches only are free to move into position to perforate a card when the mechanism is activated. The unit may be constructed to handle binary signals coded in accordance with any selected code, so as to convert that code into the desired corresponding decimal punches on the card.

Figures 1, 11A, 11B, 11C, 11D:
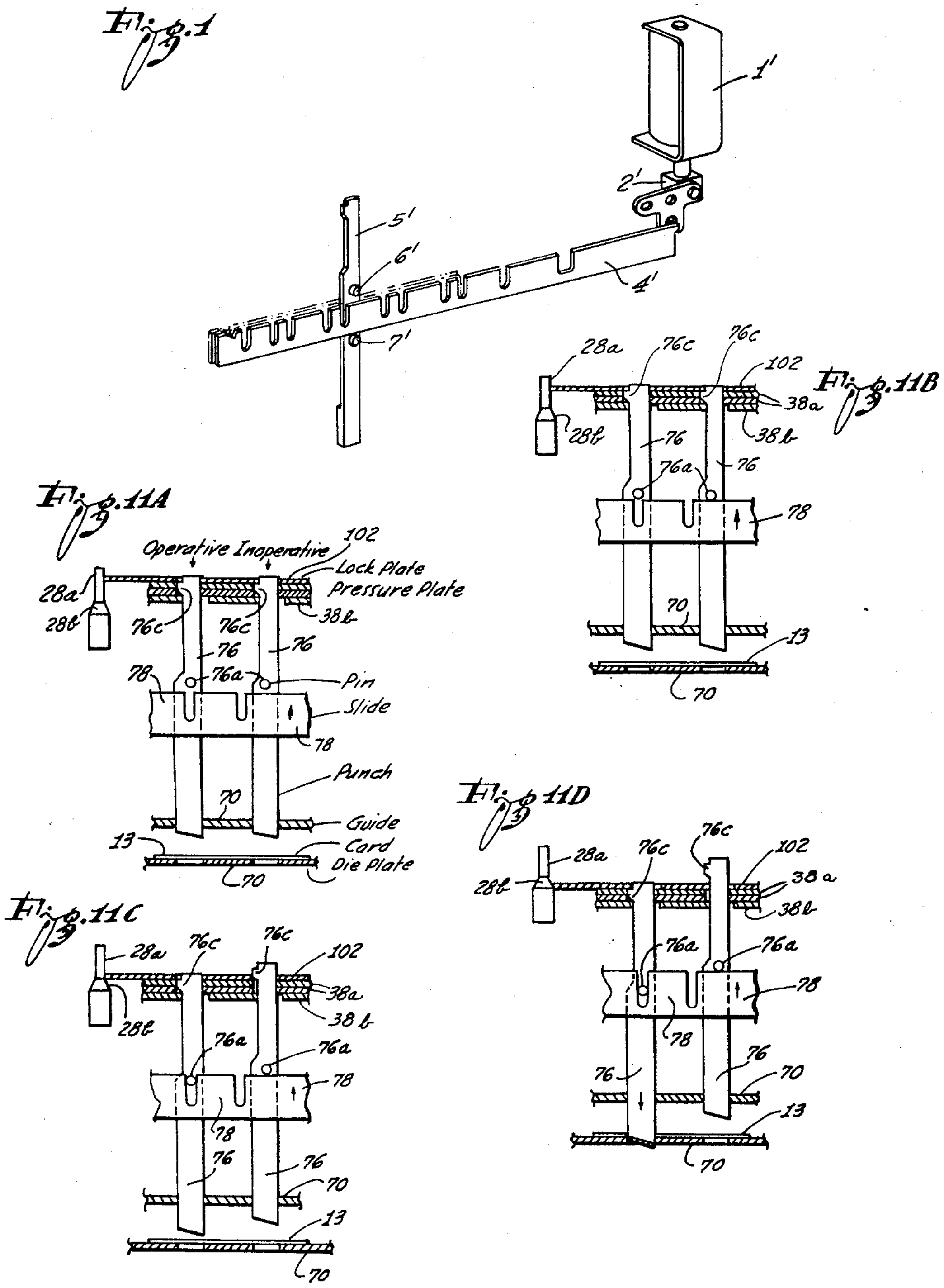
FIGS. 11A–11D are diagrams useful in explaining the operation of the mechanism of the invention.

As shown diagrammatically in FIG. 1, a solenoid 1' is coupled through a clevis 2' and bellcrank 3' to a selector slide 4'. A punch 5' has a projection 6' which normally engages the top edge of the slide so as to prevent the punch from releasing. However, when the projection 6' is aligned with a slot in the slide 4', the punch releases and may be operated to punch the corresponding position on the card.

In the unit to be described, punches 5' are provided for each numeral position in each of a plurality of adjacent columns on the card. A plurality of slides 4' are also provided, these being arranged in two tiers and on each side of the individual punches. The punches each include an additional projection 7' which engages the lower slide in the tier; and each punch is equipped with like projections on the other side.

With such as assembly, each punch is controlled by four slides, for example, and a particular punch is released only if the corresponding four binary signals applied to the four solenoids controlling the slides have a particular coded relationship.

The use of two tiers of slides permits each punch to be controlled by four slides, and yet to be separated by a single slide width. This permits the punches to be sufficiently close to one another to produce punches in adjacent columns on the card.

Figure 2:
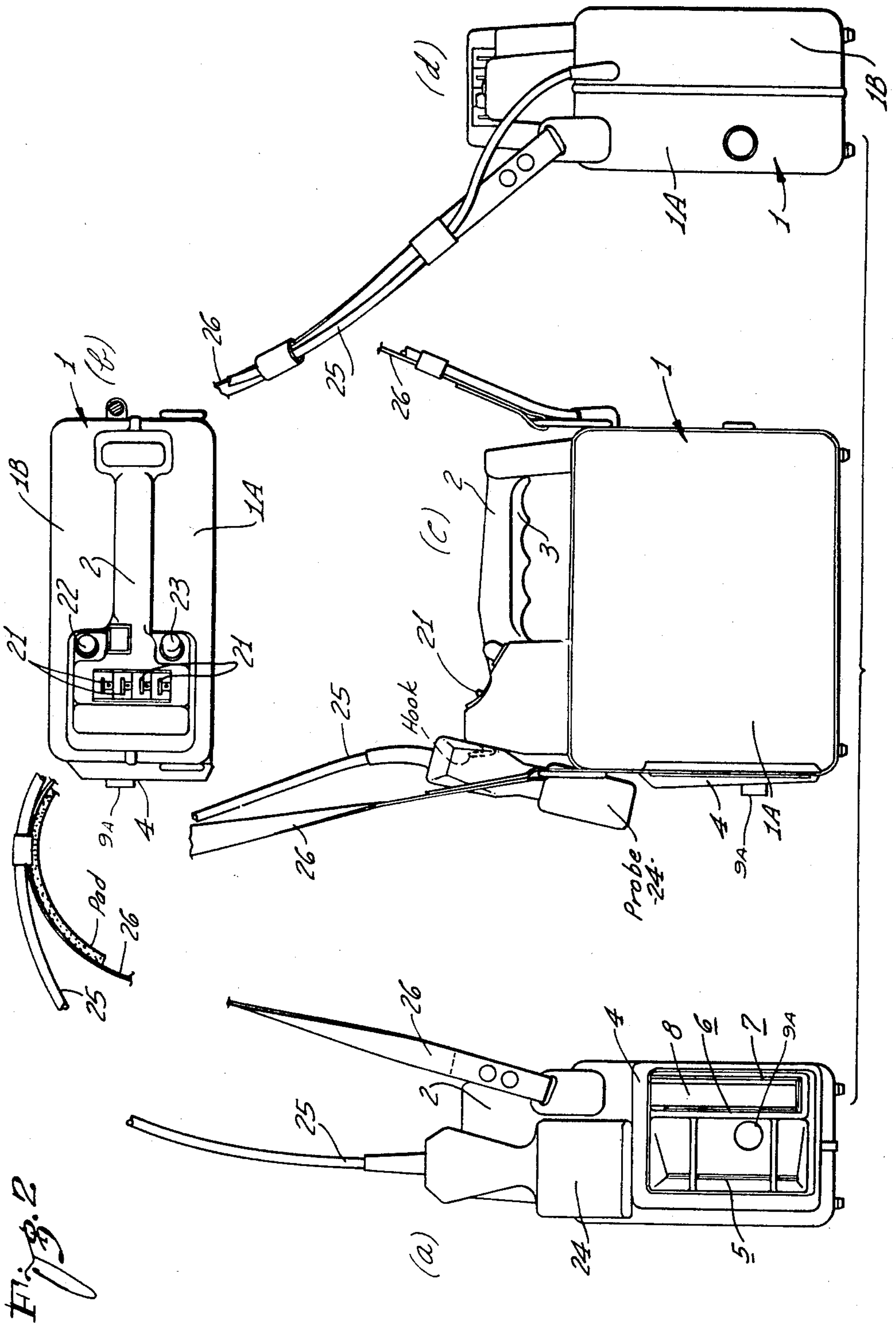
Figure 3:
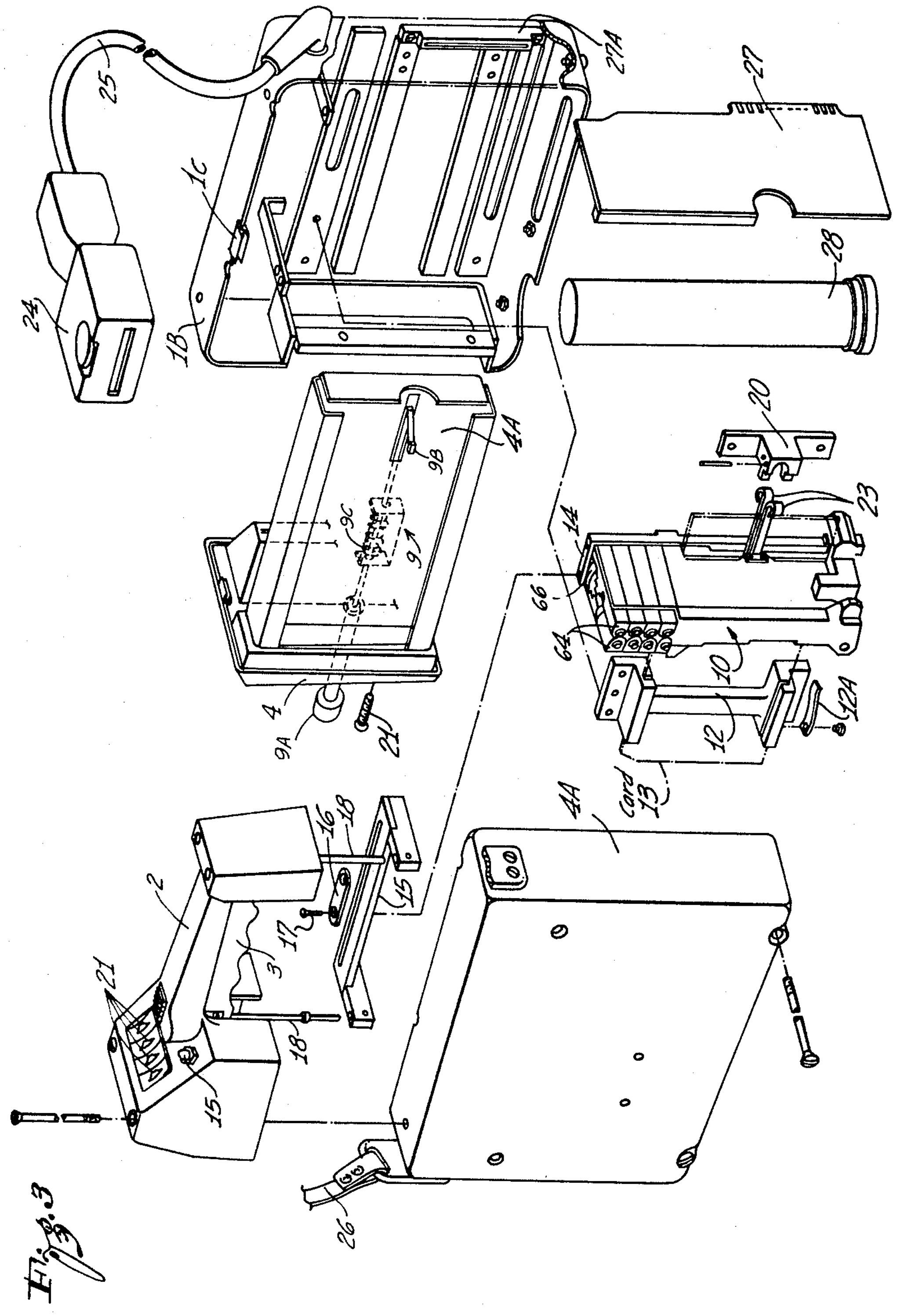
FIG. 3 is an exploded view of the card punching unit and of a card-handling mechanism included therein.

The card punching unit of the invention, as shown in FIGS. 2 and 3, is assembled in a housing 1. The housing 1 is made up of two portions 1A and 1B. The assembly also includes a handle sub-assembly 2 which is mounted on top of the casing 1.

A trigger 3 is mounted under the handle, and the punching unit is operated by squeezing the trigger 3, as will be described in detail herein.

A card entry housing 4 is mounted on the front of the housing 1, and this housing contains three slots 5, 6 and 7. The slots 6 and 7 are formed in a door 8 which is hinged to the housing 4 at its top and which includes an appropriate snap-fastner at its bottom. This door permits a cartridge of cards to be inserted into the housing 1. Cards, such as the card 13, are fed through the slot 5 in the card entry housing 4.

A card punching module 10 is mounted in the housing 1, as shown in FIG. 3. The card 13 is guided into proper position to be punched by the module 10 when the lever 3 is actuated. The module is supported in the housing by screws **12*b*** (FIG. 4A).

The module includes a module actuating bar 14 (FIG. 3) which extends up through a slot in an actuator assembly 15. The actuating bar is held to the actuator assembly by a retainer strip 16 which is mounted to the actuating bar by screws, such as the screw 17. A pair of actuator shafts 18 couple the actuator bar to the trigger 3. Grommets, such as the grommet 19, are provided to seal the shafts to the housing 1.

Thumb-operated digital switches 21 are provided on the handle assembly 2. These switches may be set in correspondence with the visual reading of a meter, for example, to provide manual setting of the unit. Manual operation is initiated by depressing a push button switch 22, as will be described in more detail in conjunction with FIG. 13.

For automatic operation, a probe 24 (disclosed in detail in the United States patent application entitled Electrically Connecting and Disconnecting identified above) is provided. The probe is connected to the electrical circuitry in the unit by means of a cable 25. The cable is conveniently supported on a carrying strap 26.

The probe is inserted into a suitable receptacle to make connection with electrical encoders. The resulting coded binary signals are translated, as described above, into correspondingly located punches in the aforesaid card when the mechanism of the invention is operated. The electrical circuitry is mounted on a circuit board 27 which is supported in a connector 27A (FIG. 3).

For manual operation, the operator merely sets each of the switches 21 to a setting corresponding to the reading of the corresponding units, tens, hundreds and thousands dial on the meter being read. He then depresses the button 22. If all is in order, a data entry lamp 23 glows, and he then squeezes the trigger 3 to punch the reading on the card 13 which he previously inserted through the slot 5 in the card entry housing 4.

For automatic operation, an appropriate switch, or other connecting means, may be provided in the probe 24, or in the receptacle in which it is inserted, so that an interlock circuit may be established, and the lamp 23 energized after the plug has been properly inserted in the receptacle, to indicate that the system is ready for the card punch mechanism to be operated. The operator then squeezes the trigger 3 to punch the card 13 inserted in the slot 5.

The aforesaid cartridge of cards, which is inserted through the door in the card entry housing 4, is supported in a frame **4*a* (FIG. 2A) which is mounted on the housing 4**.

The frame 4 has an opening in its wall, and this opening receives a card ejector 9. The card ejector has a rubber portion 9B which bears against the outermost card in the cartridge. When the ejector shaft 9A in FIG. 3 is depressed, it compresses a spring 9C, such that when released the shaft returns to its original position, the rubber portion forces the outermost card to eject out from the frame for easy removal.

The operator then inserts the ejected card into the slot 5 so that the punching operation may be carried out. He subsequently inserts the punched card back into the cartridge, on the other side of the stack of cards therein, by pushing it through the slot 7 in the card entry housing 4.

When all the cards in the cartridge have been processed, the panel 8 is opened such that the cartridge may be removed. A cartridge of unprocessed cards is then replaced and he then repeats the operations.

A fixed guide bracket 12 is mounted in the housing in front of the module 10, and this bracket serves to guide the cards to the card-receiving slot in the module. A spring strip **12*a* is mounted in a recess under the lower track of the guide 12, and this strip biases the card upwardly against the upper track so that the card is precisely held in position in the module 10**.

The module 10 can be set to a plurality of positions within the housing, so that different fields on the card 13 can be processed. This is accomplished by drilling and tapping of the appropriate holes in frame 10A.

A stop 20 is mounted in the housing portion 1B, and the card 13 is pushed into the slot 5 until it abuts against the stop 20. This assures that the card is properly positioned with respect to the module 10.

A pair of springs 17 are mounted on the stop 20. These springs are in the form of coiled strips. Their free ends are attached to the module 10. The springs move with the module as it is selectively positioned on the frame, and they serve as side guides for the card 13 at any selected position of the module.

The two housing portions 1A and 1B are sealed by a peripheral seal 1C (shown in FIG. 3 broken away, except for a small portion), so that the interior of the housing may be weather proof.

The batteries for the electronics in the unit may be housed in a cylindrical battery pack 28.

The illustrated embodiment of the module 10, as shown in FIG. 4A, includes three posts 30, 32 and 34 which are mounted in the module 10, and these posts extend upwardly through the module. A stationary top plate 36 is supported on the posts 30, 32 and 34. The top plate 36 has, for example, a rectangular configuration, as shown in FIG. 4. A movable pressure pad 38 is slidably mounted on the posts 30, 32 and 34. The pressure pad 38 may also have a rectangular configuration.

A pair of links 40 and 42 are pivoted to the top plate 36 by pivot pins 44 and 46. A further sliding link 48 is pivoted to the two links 40 and 42 by means, for example, of pivot pins 50 and 52. A further pair of links 54 and 56 couple the links 40 and 42 to the pressure pad 38. A similar linkage exists between the link 49 and the pressure pad 38, on the opposite side of the mechanism from that shown in FIG. 4B.

A pair of strips 60 are coupled to the link 48, and to a similar link 49 (FIG. 4A) on the opposite side of the mechanism. These strips are, in turn, connected to the bar 14.

The assembly is such that when the bar 14 is moved to the right in FIGS. 4A and 4B, the links 40 and 42 turn in a counter-clockwise direction to cause the associated linkage to move the pressure pad 38 down along the posts 30, 32 and 34.

When a card 13 is inserted into a slot 63 in the module 10, a punched record is made on the card when the bar 14 is moved to the right in FIGS. 4A and 4B. Such movement of the bar causes the pressure pad 38 to move down the posts 30, 32 and 34 from its upper stand-by position to a lower card-perforation position, as will be described.

A first plurality of solenoids 64 are mounted on one side of a mounting pad integral with the module frame 11, as shown in FIG. 4B, and a second plurality of solenoids 66 is mounted on the other side of the mounting pad. Also a solenoid 65 is included (FIG. 7), for reasons to be described.

In a constructed embodiment of the invention, eight solenoids were included in the plurality 64 and eight solenoids were included in the plurality 66. Each of the solenoids is mechanically coupled to a slide 78, as will be described. Each slide 78, in turn, is movable horizontally between a first and a second position. When the slides are in their first position, all the punch elements 76 in the mechanism, with the exception of the punch element 76M designating decimal "0," are incapable of being moved down to their card-perforating position.

However, the solenoids in the pluralities 64 and 66 respond to binary coded signals introduced to the mechanism from the receptacle in which it is plugged. These signals cause the solenoids to move the slides selectively to a second position. As the slides are moved to their second position, different ones of the punch elements are released, depending upon the particular code of binary coded signals applied to the solenoids. The released punches can then be moved down to their card-perforating positions by the springs 112 (FIG. 9) and the pressure pad 38.

Therefore, when the plug 24 is plugged into a receptacle of a particular utility meter, the binary coded signals derived from the receptacle energize the solenoids of the pluralities 64 and 66 in selected patterns, so that punch elements corresponding to the readings may be released and driven to provide a record in the card inserted into the slot 63 (FIG. 4B).

The additional solenoid 65, referred to above, is energized whenever the data input to the mechanism is set manually, in accordance with visual readings from a particular meter which is not equipped with an encoder. This latter solenoid serves to operate an extra punch, so that a punch record may appear on the card, indicating that the reading was set in maunally rather than automatically.

It should be noted that when the mechanism is operated automatically, the previous settings of the manual switches are overridden; so that there is no need to return all the switches to "0" after each setting.

The internal components of the mechanism are shown in greater detail in FIG. 5.

As shown in FIG. 5, two lamination plates 70 are supported on spacer **70*a*. The plates 70 and spacer 70*a* are supported on the posts 30, 32 and 34, and are held in place, for example, by means of nuts 72 and 74. The lamination plates 70 are apertured so as to receive a plurality of punch elements 76**, the punches being supported for reciprocal vertical movement in the frame.

The lamination plates 70, and spacer **70*a* are positioned above the card-receiving slot 63, and these upper plates function as guides for the punch elements. The die plate 70*b* is positioned under the card-receiving slot 63. The plates 70 are of aluminum, and the die plate 70*b*** of steel.

Figure 7:
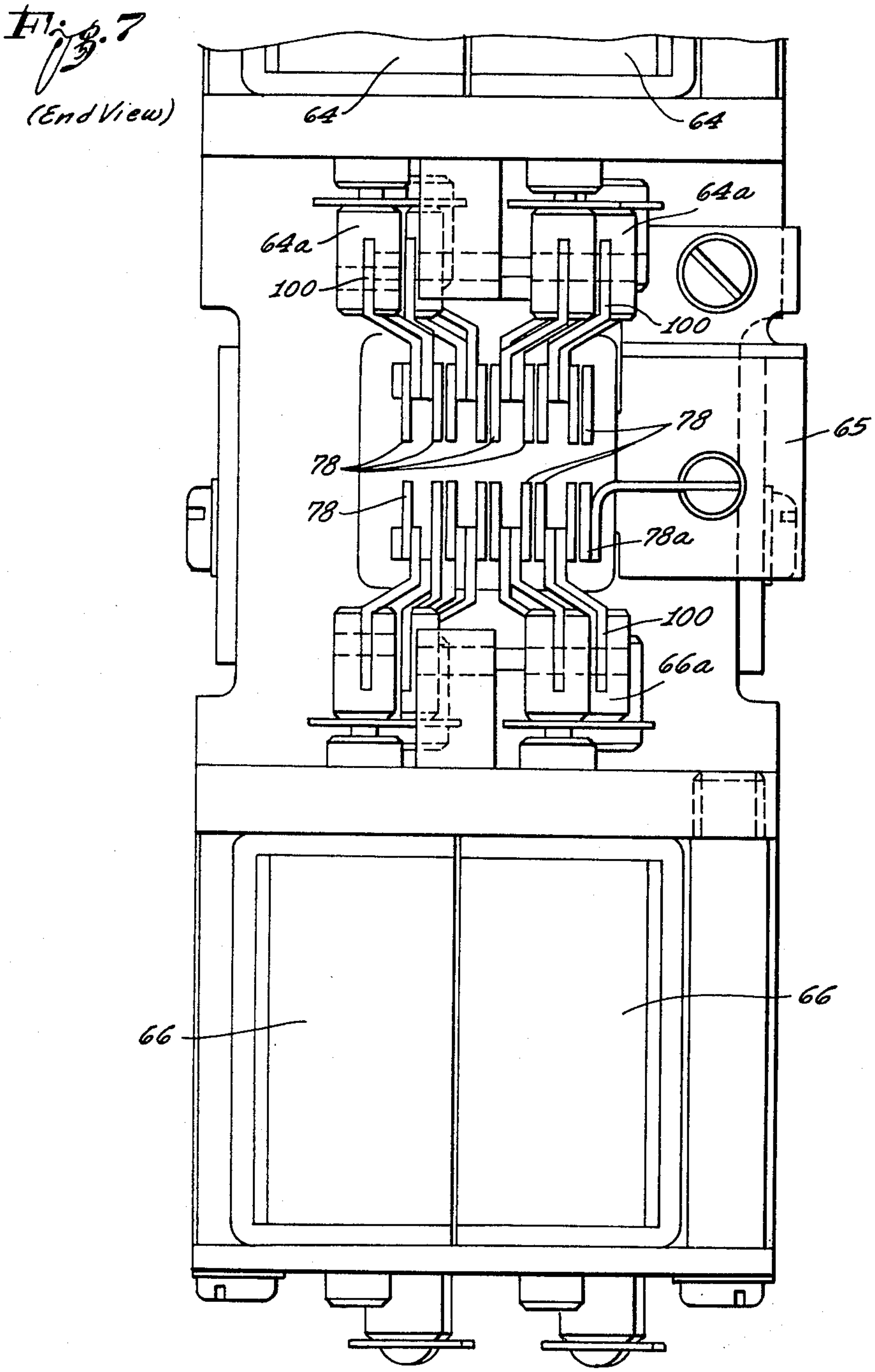
FIG. 7 is a view of the card punching module taken from the right hand end of FIG. 5.
Figures 9, 10:
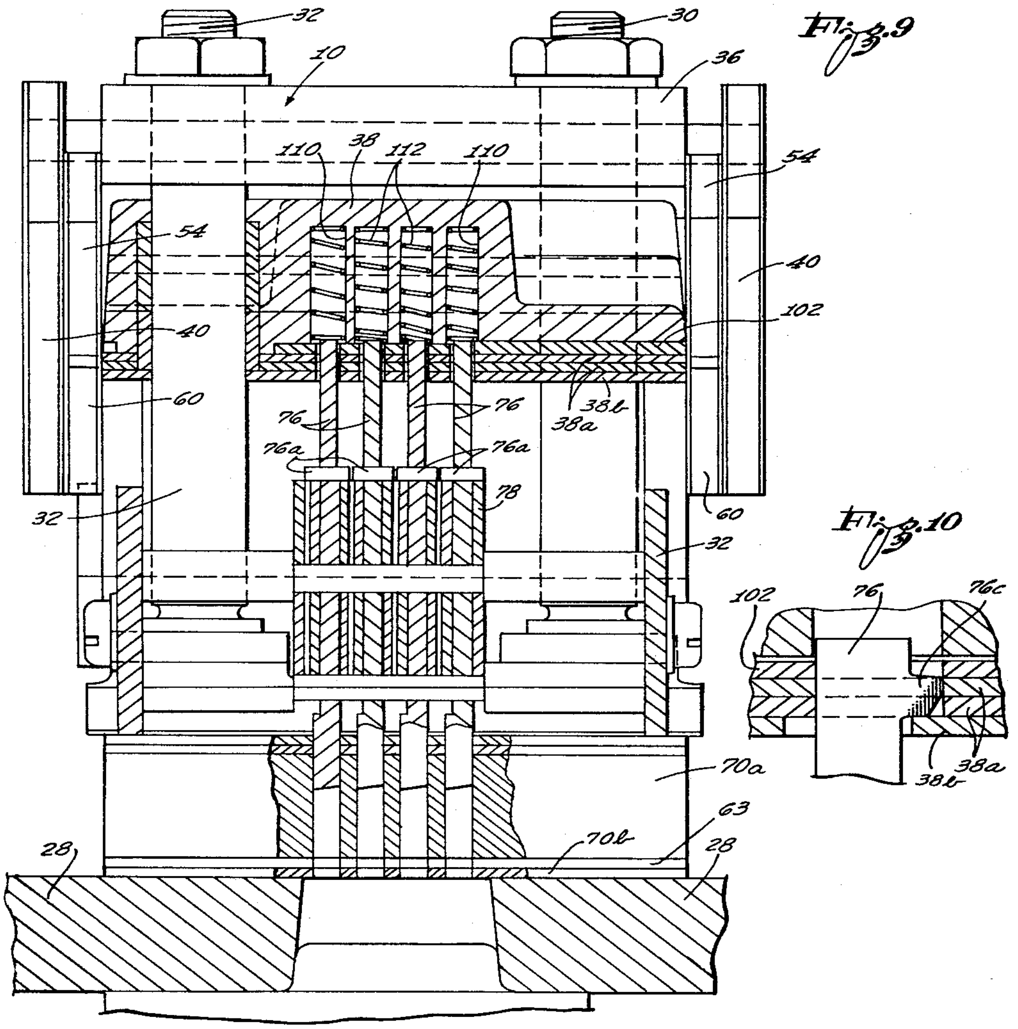
FIG. 9 is a sectional view of the card punching module taken along the line 9B—9B of FIG. 4.
FIG. 10 is a fragmentary detailed representation of one of the punch elements which are included in the module, on an enlarged scale.

A plurality of selector slide members 78 are supported in the frame 10 for horizontal reciprocal movement, and these slides are grouped into an upper group and a lower group, as shown in FIG. 5; and as also shown, for example, in FIGS. 7 and 9. The slides 78 are supported on transverse rods 80 which extend across the frame.

As mentioned briefly above, each of the selector slides 78 may be moved horizontally between a first position and a second position, in transverse relationship to the paths of the punches 76. Each of the punch elements includes a projection 76 and a projection **76*b*. These projections normally engage the edges of the respective slides 78 of the first and second groups. As shown in FIG. 5, for example, each slide is provided with a slot which extends down from its upper edge. When selected slides 78 are moved to the right in FIG. 5, for example, different ones of the punches 76 are released as their projections 76*a* and 76*b*** become aligned with corresponding slots in the slides.

Figure 8:
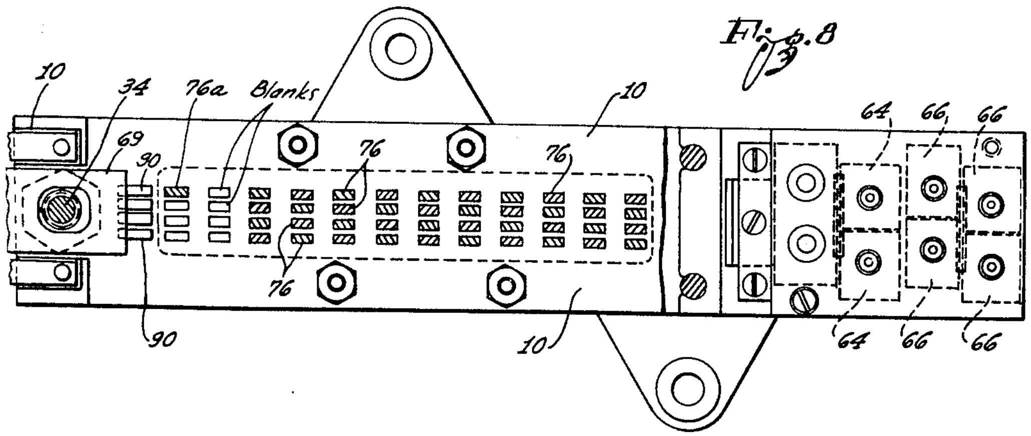
FIG. 8 is a sectional view of the card punching module taken along the line 8A—8A of FIG. 5.

As best shown in FIG. 8, the punches 76 are arranged in four columns, with ten punches in each column. To the left of the tenth row there is a row of blanks; and the additional punch which indicates whether the data is applied by the manual switches, is located in the extreme upper row. There are eight slides 78 in each of the two groups. That is, there are eight top slides and eight bottom slides. The slides 78 are interposed between the punches 76, and each punch is controlled by two top slides and two bottom slides.

The slides 78 and punches 76 are arranged into a mechanical binary-decimal decoder. The control signals applied to the solenoids 64 and 66 are binary coded, as mentioned above. As different patterns of the solenoids are energized, different slides 78 are caused to move to their right hand position. This action releases particular punches 76 in each of the four columns. The punches so released, in each instance, represent the decimal equivalent of the particular corresponding binary coded input signal.

A solenoid controlled locking mechanism (FIGS. 5 and 8) is provided, and includes resilient locking members 90 having bent portions **90*a*, 90*b* and pivotally mounted on pins 92 in frame 10. Portions 90*a* and 90*b* are normally spring biased downwardly to engage the vertical walls of notches 91 in slides 78**, thereby limiting the leftward movement of the slides.

Solenoid 67 is mounted on frame 10 and has actuating members 69 secured to its armature. Members 69 overlap at their right hand edge members 90.

When solenoids 64, 66 are energized, solenoid 67 is simultaneously energized and depresses members 69, in turn pivoting members 90 up out of contact with the slides. Soleonid 67 is deenergized after 25 milliseconds, allowing members 90 to drop into the grooves 91 of those slides 78 that have not been moved to the right and into contact with the left ends of those slides that have been moved to their right hand position. Thus, when solenoids 64, 66 are deenergized after 50 milliseconds, the slides will be locked in their respective positions.

As best shown in FIG. 5, each of the slides 78 includes a tang at its right hand end which receives a corresponding pivoted linkage member 100. Each member 100 is pivoted, for example, to the frame 28. Also, each linkage member 100 is also pivoted to the armature 64a of a corresponding solenoid 64, or to an armature 66a of a corresponding solenoid 66.

The pivoted linkage members 100 are arranged, so that the downward movement of selected armatures 64a causes the corresponding slides 78 to move selectively to the right in FIG. 5; and upward movement of other selected armatures 64b of a solenoid 64 produces such right hand motion to other ones of the slides 78. The coupling of the linkages 100 to the armature 66a is made in a similar manner.

The above described assembly, as shown in FIGS. 5 and 7, permits acompact placement of the solenoids and coupling assembly. The solenoids are constructed, so that certain ones produce downward motion of their armatures upon energization, and others produce upward motion. In this manner, individual movement of the slides 78 to the right in FIG. 5 is accomplished, when their corresponding solenoids are energized. Likewise, the slides are returned to their left hand positions in FIG. 5 when the solenoids are deenergized by the spring-biasing of the solenoid armatures.

As mentioned above, an additional solenoid 65 is provided, and this solenoid is coupled to a slide 78a (FIG. 7). The solenoid 65 is energized whenever the mechanism is used in conjunction with a visual reading operation, such as described above. When the solenoid 65 is energized, its corresponding slide 78a is moved, so that a corresponding punch 76a (FIG. 8) may be released to provide a punched indication on the card, indicating that the particular recording has been controlled by manually setting the switches 21 (FIG. 2) to correspond to a visual reading.

The pressure pad 38 includes a plurality of laminations 38a, the lowest of which defines its bottom face. These laminations 38a are similar to the lamination plates 70, so as to facilitate the construction of the mechanism.

A further plate 102 is interposed between the stack of lamination plates 38a and the bottom surface of the pressure pad 38. The further plate 102 serves as a locking plate for the punches. The locking plate 102 is slidable horizontally to the left and right in FIG. 5, and it is normally spring-biased to the right by means, for example, a spring 104. The right hand end of the locking plate 102 engages a surface 28a on the frame 28. The surface, as shown in FIG. 5, is generally vertical. However, as the pressure pad 38 approaches its punch position, the aforesaid surface is cammed (as at 28b) to the left, so that the locking plate 102 is shifted to the left, against the tension of the spring 104.

Each of the punches 76, as shown in FIG. 5, and as also shown in the detailed view of FIG. 10, is slidable in a corresponding chamber 110 in the pressure pad 38. A compression spring 112 is contained in the chamber 110, and this spring bears against the upper end of the corresponding punch 76.

It will be observed in FIGS. 5 and 10, for example, that each punch 76 has a projection 76d extending from one side thereof. This projection normally overlies the bottom lamination 38b, and the engagement of the bottom plate with the projections 76d serves to return all the punches 76 to their uppermost position when the pressure pad 38 is returned to its upper position.

When the pressure pad 38 is moved to its lower position, by the action of the handle 14, of FIGS. 4A, 4B, the punches which are retained by the slides 78 remain in their upper position, and the pressure pad merely moves downwardly against the springs 112 towards the upper ends of these punches, as the corresponding springs 112 are compressed. However, the punches 76 which are released, due to the alignment of their projections 76a with the slots in the corresponding slides 78, are biased downwardly. Then, as the locking plate 102 meets the aforesaid cammed surface, it shifts to the left and over the upper side of each of the projections 76d of the downwardly biased punches 76. This engagement occurs only with the punches 76 which have been biased down into the slots of the corresponding slides 78. The other punches 76 are displaced upwardly with respect to the pad 38, so that the locking plate 102 moves under their projections 76d.

The engagement of the locking plate 102 with the projections 76d of the punches 76 which are to be operated, as the pressure pad 38 is moved downwardly, permits a positive pressure to be exerted against these punches by the locking plate 102, when they are required to perform their card-perforating operation.

The operation, as described above, is best illustrated in the diagrams of FIGS. 11A–11D. In these diagrams, it is assumed that the illustrated slide has been moved into position to free the left-hand punch 76. The other slides have been omitted in order to simplify the description.

Then prior to the punching operation, the illustrated punches are in the "up" position, as shown in FIG. 11A. When the punching operation is initiated, the pressurepad moves both punches down to the position shown in FIG. 11B. Now, further downward motion of the right-hand punch is prevented since its projection 76a contacts the upper edge of the slide 78.

As the punching section progresses to the condition shown in FIG. 11C, the left-hand punch 76 is moved down towards a punching position, as its projection 76a moves down into the slot in the slide 78. The right-hand punch 76, on the other hand, remains in the "up" position.

The locking plate 102 now rides along the cammed surface 28b, so that when the punching operation continues to the condition of FIG. 11D, the locking plate has moved over the projection 76d of the left-hand punch 76. The locking plate then causes a positive force to be transmitted from the pressure pad to the left-hand punch, so that it is driven through the card, with sufficient force to pierce and punch the card.

It will be appreciated that when the punching operation is completed, and the pressure pad is returned to its "up" position, the pressure plate 38b engages the under side of the projection 76d, of the left-hand punch and ultimately the under side of the projection 76d of the right-hand punch, so that both punches are returned to the "up" position of FIG. 11A.

The circuitry to be described permits the solenoids to be controlled by the setting of the manually operated digit switches 21 or, alternately, by the signals derived from the probe, or plug, 24. The circuit is such that one or the other conditions prevail and there is no need, for example, to return the manual digit switches to zero before the probe signals can be used.

When the probe 24 is properly plugged into an appropriate receptacle, an inter-lock switch (which may be located in the receptacle) switches the circuit to "automatic." The solenoids are then controlled by the signals derived from the receptacle.

Alternately, when the digital switches 21 have been set in accordance with the visual readings of a meter, and the switch 22 closed, the circuit is then set to "manual." The solenoids are now controlled by the settings of the digital switches.

Figure 13:
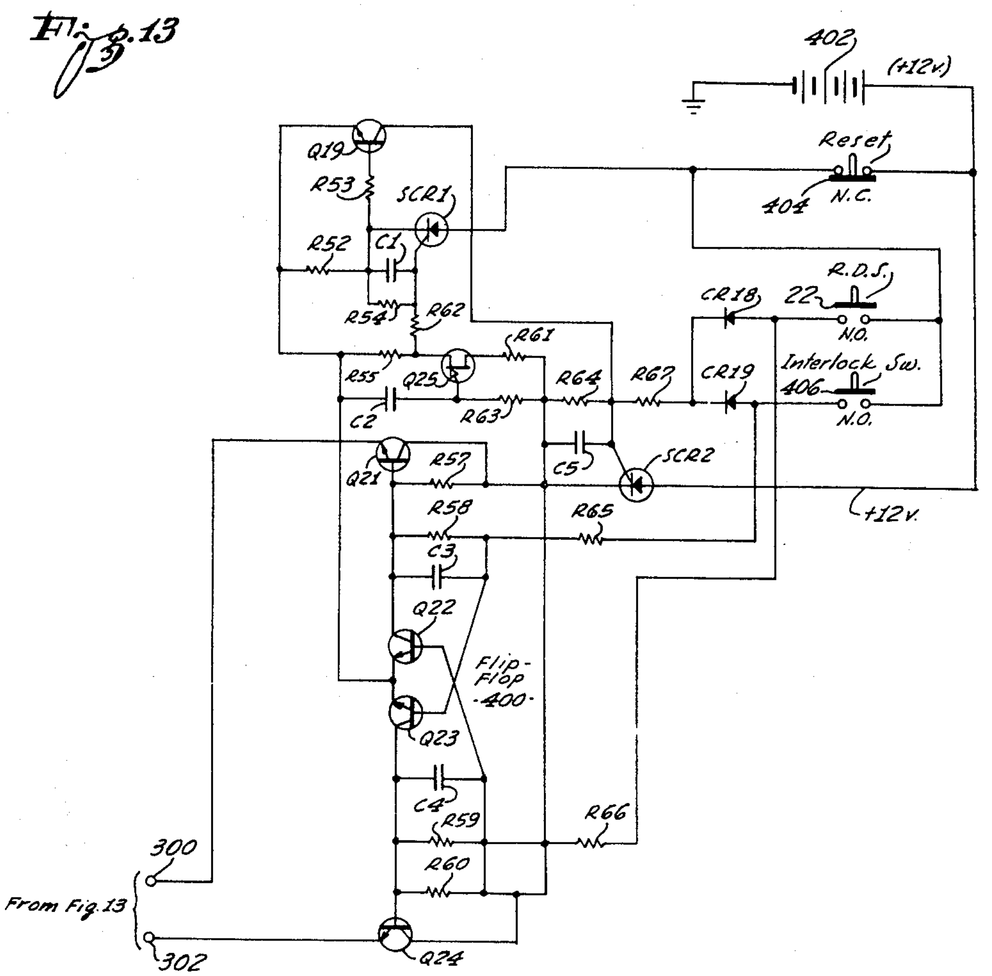
FIGS. 12 and 13 illustrate an electrical circuit diagram of the electronics contained in the unit.
Figure 12:
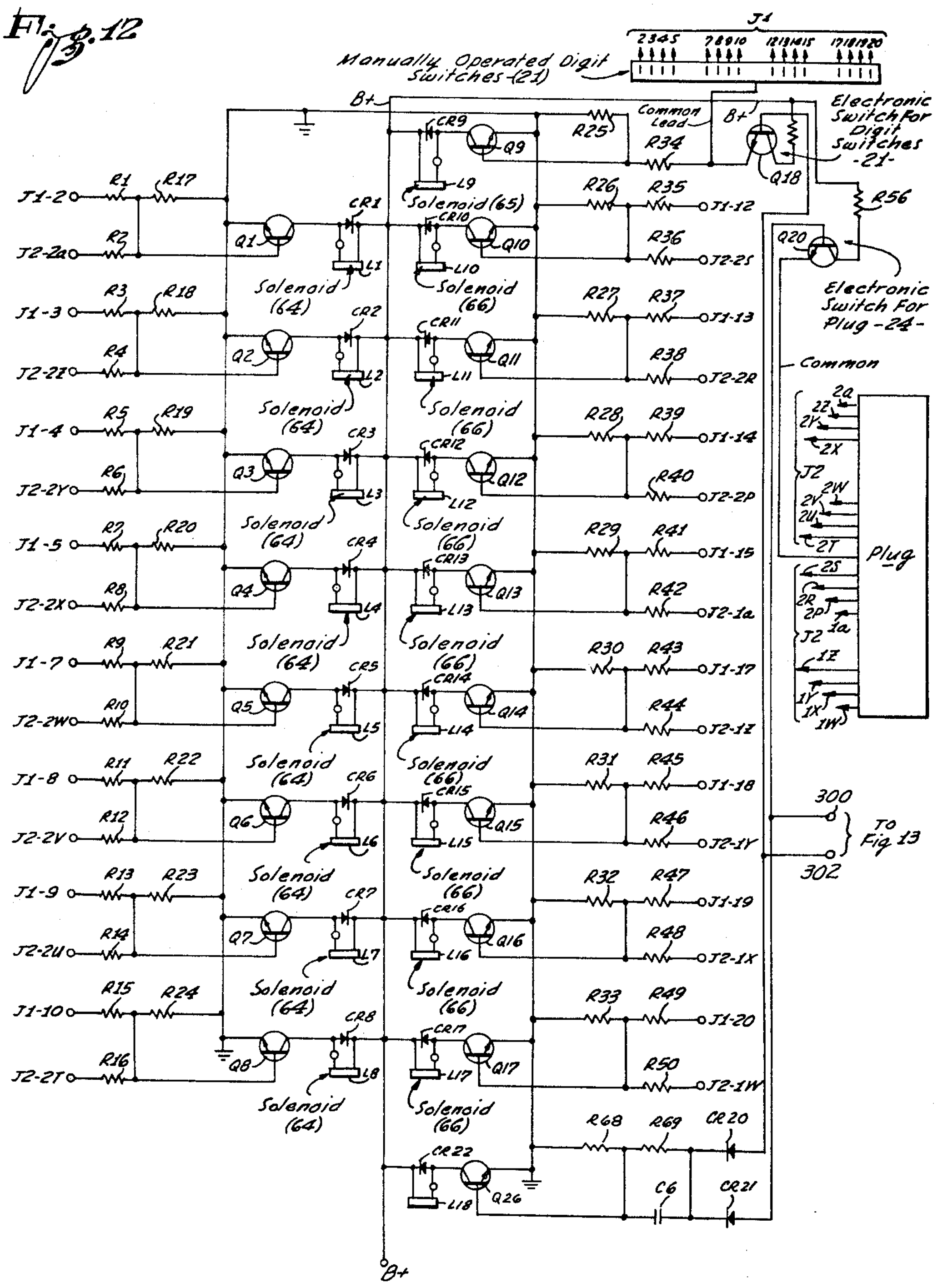

In either event, the circuit of FIGS. 12 and 13 controls the application of power to the solenoids so that it occurs for a brief interval only (for example, 40–50 milliseconds). This is long enough for the solenoids to move the selected slides to their actuated positions. As described above, the selected slides are locked at the actuated positions and the power through the solenoids can be terminated. This provides for minimum battery power thus enabling the use of a light weight, inexpensive rechargeable battery, to be housed in the unit.

The disclosed circuitry permits the current through the external circuit, such as a meter encoder, to be held to a minimal value by use of transistor amplifiers as buffers between external circuits and solenoids. This permits the use of low current contacts at the data source.

The use of transistor amplifiers and the associated bias network permits wide variations in external circuit without adversely affecting the integrity of operation.

The electronic circuitry of the unit is shown in FIGS. 12 and 13, as mentioned above. The circuitry of FIG. 12 shows the various solenoids 64 and 66 discussed above. The group of solenoids 64 is designated L1–L8, and the group of solenoids 66 is designated L10–L17. The additional solenoids 65 (which is actuated when the unit is set to manual operation) and 67 (which locks the slides) are designated L9 and L18. The solenoids are respectively shunted by diodes CR1–CR17, and CR22 for inductive transient suppression.

The various solenoids shown in FIG. 12 are driven by corresponding transistor circuits including, for example, a plurality of NPN transistors Q1–Q17. The transistor Q1, for example, is connected to the solenoid L1 in the manner illustrated in FIG. 12, and a pair of input terminals J1–2 and J2–2*a* are connected to the transistor Q1. A network including resistors R1, R2 and R17 is included in the input circuit of the transistor Q1. Each of these resistors may have a resistance of, for example, 470 ohms. It is this network that permits external circuit variations.

Similar networks are connected to the other transistors. Other input terminals, designated as shown in FIG. 12, are respectively coupled to the different networks. The digit switches 21 are connected, for example, to the input terminals J1–2, J1–3, J1–4, J1–5; J1–7, J1–8, J1–9, J1–10; J1–12, J1–13, J1–14, J1–15; J1–17, J1–18, J1–19, J1–20. The digit switches also have a common lead connected to the emitter of a transistor Q18. The transistor Q18 is connected as an electronic switch, and its collector is connected to the positive lead B+ through a 10 ohm resistor R51.

In a manner to be described, when the system is set to the "manual" mode, a circuit is completed briefly to the base of the transistor Q18 by the circuit of FIG. 13 and by way of a terminal 300. This connection is established for a time interval of, for example, 50 milliseconds. During that time interval, each of the digit switches 21 which has been set to the "1" position causes a current to flow through the respective ones of the transistors Q1–Q17, so as to energize the corresponding solenoids and lock the various selector slides controlled thereby in their displaced position.

The circuit of FIG. 12 also includes a transistor Q20 which is connected to the positive lead B+ through a resistor R56. The common lead from the probe or plug 24 is connected to the emitter of the transistor Q20. The transistor Q20 also operates as an electronic switch.

In a manner to be described, when the system is established to the "automatic" mode, a circuit is completed briefly to an input terminal 302 from the circuit of FIG. 13. This input terminal is connected to the base of the transistor Q20, so that when the circuit is completed, the transistor is rendered conductive for a brief interval.

The leads from the probe, or plug 24, are connected to respective input terminals J2–2*a*, J2–2*z*, J2–2*y*, J2–2*x*; J2–2*w*, J2–2*v*, J2–2*u*, J2–2*t*; J2–2*s*, J2–2*r*, J2–2*p*, J2–1*a*; J2–1*z*, J2–1*y*, J2–1*x*, J2–1*w*, of the circuit of FIG. 12.

It will be appreciated that the system is such that either the signals from the probe 24 are applied to the circuit of the solenoids, or the signals from the digit switcres 21. Also, in each instance, the application of the signals is for a brief interval only. There is no need to return the digit switches to zero when the unit is being operated in the automatic mode, because the common connection to the digital switches remains open during that mode due to the non-conductive condition of the transistor Q18, so that the switches are all ineffective.

The control for the transistors Q18 and Q20 through the terminals 300 and 302 is by means of a flip-flop 400 in the circuit of FIG. 13, which is made up of a pair of NPN transistors Q22 and Q33. The transistors Q21 and Q24 serve as output stages for the flip-flop, and they include respective 2.2 kilo-ohm resistors R57 and R60 in their circuit. The emitter of the transistor Q21 is connected to the terminal 302, and the emitter of the transistor Q24 is connected to the terminal 300. This flip-flop acts as a memory device which will permit the selected solenoids to remain active following the release of the activating switch.

When either of the terminals 300 or 302 acquire a positive potential, by means of the aforementioned flip-flop 400, this potential is applied to the base of transistor Q26 through either the diode CR20 or CR21 and through the capacitor C6. The capacitor C6 will integrate the control pulse such that solenoid L18 will release prior to the release of the solenoid L1–L17. Thus the slide lock will lock all slides prior to the release of the selected slides. The conduction period of Q26, say 25 milliseconds, is controlled by the time constant of C6 and R68. The resistor R69 will act to remove the charge from C6.

The push button switch 22 discussed in conjunction with FIGURE 2 is a normally open switch. When that switch is depressed for manual operation of the system, it serves to place the +12 volt potential from a battery 402 on the circuit. A current flows through a normally closed reset switch 404, through the switch 22 and through a 10 kilo-ohm resistor 66 to the flip-flop so as to set the flip-flop in a first state.

On the other hand, when the system is to be operated in the automatic mode, an interlock switch 406 which, as noted above, may be located at the receptacle or in the plug 24, is closed when the plug is properly connected into the receptacle. When the switch 406 closes, a current flows through a 6.8 kilo-ohm resistor R65 to the other side of the flip-flop so as to trigger the flip-flop to its second state.

When either of the switches 22 or 406 is closed, current also flows through the diodes CR18 or CR19 and through a pair of 4.7 kilo-ohm resistors R67 and R64, so as to fire a silicon controlled rectifier SCR2. The firing of the SCR2 is due to the charge which builds up across the capacitor C5 which, for example, may have a capacitance of .0015 microfarad. The firing of the silicon controlled rectifier SCR2 effectively connects the positive lead from the battery 402 to the flip-flop, so that the flip-flop remains energized only so long as the SCR2 is fired.

The current flow through the resistors R67 and R64 also flows through a 47 kilo-ohm resistor R63 to charge a capacitor C2. The capacitor C2 may, for example, have a capacity of 1 microfarad. The capacitor C2 is connected to the emitter of a unijunction transistor Q25. The first base of the transistor Q25 is connected through a 470 ohm resistor R61 to the junction of the resistors R63 and R64. The second base of the unijunction transistor is connected to a 47 ohm resistor R55 and through a 2.2 kilo-ohm resistor R62 to the gate electrode of a silicon controlled rectifier SCR1. After a time interval determined by the time constant of the circuit R63 and C2, for example, the transistor Q25 generates a short duration pulse which fires the silicon controlled rectifier SCR1. The cathode of SCR1 is connected through a 4.7 kilo-ohm resistor R53 to the base of a transistor Q19, and the firing of the SCR1 causes the transistor Q19 to become highly conductive.

As shown, the gate of the transistor SCR1 is connected to a .0015 microfarad capacitor C1 which is shunted by a 4.7 kilo-ohm resistor R54. The emitter of the transistor Q19 is connected through a 1 kilo-ohm resistor R52 back to the cathode of SCR1.

The collector of the transistor Q19 is connected back to the gate of SCR2. When the transistor Q19 becomes highly conductive, it effectively short circuits the capacitor C5 and renders SCR2 non-conductive. This effectively deenergizes the flip-flop 400.

Therefore, when either the switch 406 or the switch 22 is actuated, the flip-flop 400 is triggered to one condition or the other so as to render either the electronic switch of the transistor Q18 conductive or the electronic switch of the transistor Q20 conductive. Then, after a brief interval of time, for example, of the order of 50 milliseconds, the transistor Q19 becomes highly conductive, so as to deenergize the flip-flop and effectively open whichever one of the electronic switches which was previously closed.

The control is such that when either of the switches 22 or 406 is actuated, the selected solenoids are energized briefly, and no further energizing current flows, even though the respective switches are held in their down position. In order to recondition the circuit, the reset switch 404 must be opened. This serves to return the silicon controlled rectifier SCR1 to its non-conductive state, thereby rendering the transistor Q19 non-conductive. Only then can SCR2 again be fired, so as to energize the flip-flop 400.

It will be observed that the resistor R65 has a lesser resistance than the resistor R66, so that should both the switches 22 and 406 be closed together, the interlock switch 406 will override, and the system is set to the automatic mode. However, whenever one or the other of the switches 22 or 406 has been operated, the other is ineffective until the circuit has been reset by actuation of the reset switch 404.

The invention provides, therefore, an improved data acquisition and recording mechanism which may be carried to any data source. The data source includes, for example, a receptacle where binary-coded signals, representative of the particular data, may be derived. These signals establish certain controls in the mechanism, as described, enabling punches, or other record making elements, to be released. This permits a record, for example, in a decimal code, to be made on a card, or other medium, which is in position in the mechanism.

While a particular embodiment of the invention has been illustrated and described, modifications may be made. The following claims are intended to cover all modifications which fall within the true spirit and scope of the invention.

What is claimed is:

1. In a mechanism for decoding and recording data which includes a frame for supporting a member on which said data is to be recorded, and a plurality of recording elements slidably mounted in said frame and individually movable between a stand-by position and a recording position, the combination of: a plurality of control slides slidably mounted in said frame and movable in a direction transverse to the direction of movement of said recording elements between a first position and a second position, said recording elements having projections engaging the respective edges of said slides, said slides having slots therein to free the projections of selected ones of said recording elements as selected ones of said slides are moved to said second position thereof, a plurality of said slides engaging each of said recording elements when in said first position and permitting selected ones of said recording elements to be moved to said recording position as selected ones of said slides are moved to said second position; control means for selectively moving said slides between said first position and said second position thereof; and actuating means for said recording elements mounted on said frame and movable between a first position and a second position to move selected ones of said recording elements to said recording position, as determined by said slides when said slides are selectively moved to said second position, and subsequently to return such recording elements to said stand-by position.

2. The combination of claim 1 in which said slides are mounted in said frame in two groups, one above the other.

3. The combination of claim 1 which includes means for locking individual ones of said slides in said second position; and means coupled to said actuating means for releasing said locking means when the aforesaid punch elements are returned thereby to said stand-by position thereof.

4. The combination of claim 1 in which said control means includes a plurality of solenoids respectively coupled through pivoted linkage members to individual ones of said slides.

5. The combination of claim 1 in which said actuating means includes a plurality of laminated plates mounted in said frame and having apertures extending therethrough for receiving said recording elements, one of said plates having portions overlapping the apertures of the remainder of said plates, said recording elements having extensions adjacent and above said portions of said one plate whereby said one plate is arranged to return said selected recording elements to said stand-by positions when said actuating means is returned from said second to said first position.

References Cited

UNITED STATES PATENTS

| | | | |
|---|---|---|---|
| 2,044,708 | 6/1936 | Lasker | 239—91 X |
| 2,448,961 | 9/1948 | Curtis | 234—102 X |
| 2,669,303 | 2/1954 | Hendrich | 234—93 X |
| 2,945,537 | 7/1960 | Lindberg | 234—102 |
| 3,051,375 | 8/1962 | Bergman | 234—91 X |

WILLIAM S. LAWSON, *Primary Examiner.*